(12) United States Patent
Liu et al.

(10) Patent No.: US 11,830,033 B2
(45) Date of Patent: Nov. 28, 2023

(54) THEME RECOMMENDATION METHOD AND APPARATUS

(71) Applicant: HUAWEI TECHNOLOGIES CO., LTD., Guangdong (CN)

(72) Inventors: Zhirong Liu, Shenzhen (CN); Ruiming Tang, Shenzhen (CN); Zhenhua Dong, Shenzhen (CN); Xiuqiang He, Shenzhen (CN); Guoxiang Cao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 493 days.

(21) Appl. No.: 16/198,704

(22) Filed: Nov. 21, 2018

(65) Prior Publication Data

US 2019/0087884 A1 Mar. 21, 2019

Related U.S. Application Data

(63) Continuation of application No. PCT/CN2016/105167, filed on Nov. 9, 2016.

(30) Foreign Application Priority Data

May 24, 2016 (CN) .......................... 201610351369.6

(51) Int. Cl.
*G06Q 30/02* (2023.01)
*G06Q 30/06* (2023.01)
(Continued)

(52) U.S. Cl.
CPC ....... *G06Q 30/0255* (2013.01); *G06F 16/285* (2019.01); *G06Q 30/0251* (2013.01); *G06Q 30/0631* (2013.01)

(58) Field of Classification Search
None
See application file for complete search history.

(56) References Cited

U.S. PATENT DOCUMENTS 6,912,505 B2* 6/2005 Linden .............. G06Q 30/0633
705/14.53
7,565,370 B2* 7/2009 Milenova .............. G06F 16/285
707/999.102
(Continued)

FOREIGN PATENT DOCUMENTS

CN 101398839 A 4/2009
CN 101216825 B 10/2010
(Continued)

OTHER PUBLICATIONS

Su, X., et al., "Survey of Collaborative Filtering Techniques, A" [Abstract only] Advances in Artificial Intelligence, 2009, Hindawi Limited. (Year: 2009).*

(Continued)

*Primary Examiner* — Nicholas D Rosen
(74) *Attorney, Agent, or Firm* — Womble Bond Dickinson (US) LLP

(57) ABSTRACT

The method includes: collecting historical operations of sample users for M items, and predicting a preference value of a target user for each of the M items according to historical operations of the sample users for each of the M items, collecting classification data of N to-be-recommended items, and classifying the N to-be-recommended items according to the classification data of the N to-be-recommended items, to obtain X themes, where each of the X themes includes at least one of the N to-be-recommended items, and the N to-be-recommended items are some or all of the M items; calculating a preference value of the target user for each of the X themes according to a preference
(Continued)

value of the target user for a to-be-recommended item included in each of the X themes; and pushing a target theme to the target user.

18 Claims, 5 Drawing Sheets

(51) Int. Cl.
  *G06F 16/28* (2019.01)
  *G06Q 30/0251* (2023.01)
  *G06Q 30/0601* (2023.01)

(56) References Cited

U.S. PATENT DOCUMENTS

| | | | | |
|---|---|---|---|---|
| 8,554,703 | B1* | 10/2013 | Lin | G06N 20/00 |
| | | | | 706/12 |
| 8,571,607 | B1* | 10/2013 | Zarrow | H04M 3/02 |
| | | | | 379/373.02 |
| 8,805,851 | B2* | 8/2014 | Koike | G06Q 30/0631 |
| | | | | 707/748 |
| 2002/0007335 | A1* | 1/2002 | Millard | G06Q 40/04 |
| | | | | 705/37 |
| 2002/0019763 | A1* | 2/2002 | Linden | G06Q 30/0255 |
| | | | | 705/14.53 |
| 2005/0050087 | A1* | 3/2005 | Milenova | G06F 16/285 |
| | | | | 707/999.102 |
| 2006/0173872 | A1* | 8/2006 | Koike | G06Q 30/02 |
| 2006/0224470 | A1* | 10/2006 | Garcia Ruano | G06Q 20/102 |
| | | | | 705/40 |
| 2007/0022040 | A1* | 1/2007 | Gordon | G06Q 40/04 |
| | | | | 705/37 |
| 2008/0077574 | A1* | 3/2008 | Gross | G06Q 30/0269 |
| 2009/0006368 | A1 | 1/2009 | Mei et al. | |
| 2009/0265211 | A1* | 10/2009 | May | G06Q 20/403 |
| | | | | 705/18 |
| 2009/0277322 | A1 | 11/2009 | Cai et al. | |
| 2010/0211485 | A1* | 8/2010 | Augustine | G06Q 10/1091 |
| | | | | 705/32 |
| 2010/0268701 | A1* | 10/2010 | Zhang | G06F 16/2228 |
| | | | | 707/E17.108 |
| 2011/0158392 | A1* | 6/2011 | DeLuca | H04M 3/493 |
| | | | | 379/88.18 |
| 2012/0036037 | A1* | 2/2012 | Xiao | G06F 16/24578 |
| | | | | 705/26.7 |
| 2012/0101852 | A1* | 4/2012 | Albert | G06Q 40/08 |
| | | | | 705/4 |
| 2013/0073346 | A1* | 3/2013 | Chun | H04L 67/104 |
| | | | | 705/7.39 |
| 2014/0074828 | A1 | 3/2014 | Mathur | |
| 2014/0280575 | A1* | 9/2014 | Cowan | H04L 67/22 |
| | | | | 709/204 |
| 2015/0379610 | A1* | 12/2015 | Stankiewicz | G06F 40/216 |
| | | | | 705/26.7 |
| 2016/0027430 | A1* | 1/2016 | Dachiraju | G10L 13/02 |
| | | | | 704/262 |
| 2016/0379288 | A1* | 12/2016 | Wilkinson | H04L 67/306 |
| | | | | 705/7.13 |
| 2019/0026344 | A1 | 1/2019 | Liu | |

FOREIGN PATENT DOCUMENTS

| | | |
|---|---|---|
| CN | 102387207 A | 3/2012 |
| CN | 102831234 A | 12/2012 |
| CN | 103116588 A | 5/2013 |
| CN | 103235824 A | 8/2013 |
| CN | 102831234 B | 4/2015 |
| CN | 104603753 A | 5/2015 |
| CN | 104794115 A | 7/2015 |
| CN | 104915359 A | 9/2015 |
| CN | 105095219 A | 11/2015 |
| CN | 105205081 A | 12/2015 |
| CN | 105335491 A | 2/2016 |
| CN | 105389590 A | 3/2016 |
| CN | 105868372 A | 8/2016 |
| CN | 105095219 B | 2/2019 |
| CN | 104915359 B | 5/2019 |
| CN | 105205081 B | 11/2019 |
| KR | 101619748 B1 | 5/2016 |

OTHER PUBLICATIONS

Xi Zhang et al, TopRec: Domain-Specific Recommendation through Community Topic Mining in Social Network. WWW 2013, May 13-17, 2013, 10 pages.

* cited by examiner

THEME RECOMMENDATION METHOD AND APPARATUS

CROSS-REFERENCE TO RELATED APPLICATIONS

This application is a continuation of International Application No. PCT/CN2016/105167, filed on Nov. 9, 2016, which claims priority to Chinese Patent Application No. 201610351369.6, filed on May 24, 2016. The disclosures of the aforementioned applications are hereby incorporated by reference in their entireties.

TECHNICAL FIELD

The present invention relates to the field of terminals, and in particular, to a theme recommendation method and apparatus.

BACKGROUND

With development of application markets, competition among application providers becomes increasingly fierce. In China, the Huawei application market, the Baidu application market, the 360 application market, and the Wandoujia application market spring up. In foreign countries, App Store, Google Play, and the like occupy a large share of an application market of non-mainland users. To seize the application market, an application provider usually recommends its own applications to users by all means, to attract the users to use the applications of the application provider.

However, it is found in practice that in an existing recommendation manner, several applications in which users may be interested are simply estimated and recommended to the users, and it is difficult to arouse interests of the users and bring profits.

SUMMARY

Embodiments of the present invention provide a theme recommendation method and apparatus, to recommend a to-be-recommended item to a user in a form of a theme.

According to a first aspect, an embodiment of the present invention provides a theme recommendation method. A computing device collects historical operations of sample users for M items, and predicts a preference value of a target user for each of the M items according to historical operations of the sample users for each of the M items. M is a positive integer greater than or equal to 1. The computing device further collects classification data of N to-be-recommended items, and classifies the N to-be-recommended items according to the classification data of the N to-be-recommended items, so as to obtain X themes. The N to-be-recommended items are some or all of the M items. Each of the X themes includes at least one of the N to-be-recommended items. X is a positive integer greater than or equal to 1, N is a positive integer greater than or equal to 1, and N≤M. The computing device calculates a preference value of the target user for each of the X themes according to a preference value of the target user for a to-be-recommended item included in each of the X themes, and pushes a target theme to the target user. The target theme is a theme, with a preference value of the target user being greater than a recommendation threshold, of the X themes.

Different from the prior art in which several applications in which a user may be interested are only simply estimated and recommended to the user, according to the theme recommendation method provided in the present invention, to-be-recommended items are first classified into multiple themes, and a theme having a preference value greater than a threshold is pushed to a target user. In view of the foregoing method, multiple to-be-recommended items of a theme in which the target user is interested are pushed, so that the target user may have multiple options in a same theme. Moreover, more than one theme may be pushed to the target user, so that the target user may make a selection from multiple themes, thereby truly arousing interests of the target user and bringing profits.

In one embodiment, the computing device determines preference data of the sample users for each of the M items according to the historical operations of the sample users for each of the M items. The computing device then trains a predictive model according to characteristic data of the sample users, the preference data of the sample users for each of the M items, a context characteristic, and characteristic data of each of the M items. Finally, the computing device inputs characteristic data of the target user and the characteristic data of each of the M items to the trained predictive model, to predict the preference value of the target user for each of the M items.

In one embodiment, the computing device constructs a diagram of interaction between the sample users and the M items according to the historical operations of the sample users for each of the M items, and calculates similarity between any two of the M items according to the diagram of interaction between the sample users and the M items. Subsequently, the computing device determines a preference value of the target user for each of n operation items according to a historical operation of the target user for each of then operation items. An operation item is an item, on which the target user has performed a historical operation, of the M items. n is a positive integer greater than or equal to 1, and N≤M. Finally, the computing device predicts the preference value of the target user for each of the M items according to the preference value of the target user for each of the n operation items and the similarity between any two of the M items.

In one embodiment, the computing device performs clustering according to the classification data of the N to-be-recommended items, so as to obtain the X themes. Therefore, the computing device can automatically classify similar to-be-recommended items into a same theme, and requires no manual intervention.

In one embodiment, the computing device presets the X themes and a preset classification condition corresponding to each of the X themes. Different themes correspond to different preset classification conditions. The computing device determines whether classification data of each of the N to-be-recommended items satisfies a preset classification condition corresponding to any one of the X themes, and classifies a to-be-recommended item that satisfies the preset classification condition corresponding to any one of the X themes into a corresponding theme. Therefore, the computing device can independently set preset classification conditions of themes as required, to screen out a self-defined theme.

According to a second aspect, an embodiment of the present invention provides a theme recommendation apparatus, and the apparatus includes a prediction module, a classification module, a calculation module, and a recommendation module. The prediction module is configured to: collect historical operations of sample users for M items, and predict a preference value of a target user for each of the M items according to historical operations of the sample users for each of the M items. M is a positive integer greater than or equal to 1. The classification module is configured to: collect classification data of N to-be-recommended items, and classify the N to-be-recommended items according to the classification data of the N to-be-recommended items, so as to obtain X themes. The N to-be-recommended items are some or all of the M items. Each of the X themes includes at least one of the N to-be-recommended items. X is a positive integer greater than or equal to 1, N is a positive integer greater than or equal to 1, and N≤M. The calculation module is configured to obtain, by means of calculation, a preference value of the target user for each of the X themes according to a preference value of the target user for a to-be-recommended item included in each of the X themes. In addition, the recommendation module is configured to push a target theme to the target user. The target theme is a theme, with a preference value of the target user being greater than a recommendation threshold, of the X themes.

Different from the prior art in which several applications in which a user may be interested are only simply estimated and recommended to the user, according to the theme recommendation method provided in the present invention, to-be-recommended items are first classified into multiple themes, and a theme having a preference value greater than a threshold is pushed to a target user. In view of the foregoing method, multiple to-be-recommended items of a theme in which the target user is interested are pushed, so that the target user may have multiple options in a same theme. Moreover, more than one theme may be pushed to the target user, so that the target user may make a selection from multiple themes, thereby truly arousing interests of the target user and bringing profits.

In one embodiment, the prediction module includes a determining unit, a training unit, and a prediction unit. The determining unit is configured to determine preference data of the sample users for each of the M items according to the historical operations of the sample users for each of the M items. The training unit is configured to train a predictive model according to characteristic data of the sample users, the preference data of the sample users for each of the M items, a context characteristic, and characteristic data of each of the M items. Finally, the prediction unit is configured to input characteristic data of the target user and the characteristic data of each of the M items to the trained predictive model, to predict the preference value of the target user for each of the M items.

In one embodiment, the prediction module includes a construction unit, a calculation unit, a determining unit, and a prediction unit. The construction unit is configured to construct a diagram of interaction between the sample users and the M items according to the historical operations of the sample users for each of the M items. The calculation unit is configured to calculate similarity between any two of the M items according to the diagram of interaction between the sample users and the M items. Subsequently, the determining unit is configured to determine a preference value of the target user for each of n operation items according to a historical operation of the target user for each of then operation items. An operation item is an item, on which the target user has performed a historical operation, of the M items. n is a positive integer greater than or equal to 1, and N≤M. Finally, the prediction unit is configured to predict the preference value of the target user for each of the M items according to the preference value of the target user for each of the n operation items and the similarity between any two of the M items.

In one embodiment, the classification module includes a clustering unit. The clustering unit is configured to perform clustering according to the classification data of the N to-be-recommended items, so as to obtain the X themes. Therefore, a computing device can automatically classify similar to-be-recommended items into a same theme, and requires no manual intervention.

In one embodiment, the classification module includes a presetting unit and a classification unit. The presetting unit is configured to preset the X themes and a preset classification condition corresponding to each of the X themes. Different themes correspond to different preset classification conditions. Subsequently, the classification unit is configured to: determine whether classification data of each of the N to-be-recommended items satisfies a preset classification condition corresponding to any one of the X themes, and classify a to-be-recommended item that satisfies the preset classification condition corresponding to any one of the X themes into a corresponding theme. Therefore, the computing device can independently set preset classification conditions of themes as required, to screen out a self-defined theme.

According to a third aspect, an embodiment of the present invention provides a computing device. The computing device includes a storage unit, a communications interface, and a processor coupled to the storage unit and the communications interface. The storage unit is configured to store an instruction, the processor is configured to execute the instruction, and the communications interface is configured to transmit data to a target user. When executing the instruction, the processor may execute the method in the first aspect according to the instruction.

According to a fourth aspect, an embodiment of the present invention provides a computer readable storage medium, and the computer readable storage medium stores program code executed by the computing device to recommend a theme. The program code includes an instruction used to execute the method in the first aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Descriptions are provided below with reference to the accompanying drawings and embodiments.

A computing device may be a desktop computer (computer), a notebook (notebook) computer, a tablet personal computer (Tablet Personal Computer), a smartphone (Smart phone), or the like. Alternatively, the computing device may be a device having a processor such as a Central Processing Unit (CPU), an microcontroller unit (MCU), a digital signal processor (DSP), or a logical circuit configured to execute control or operation.

Figure 1:
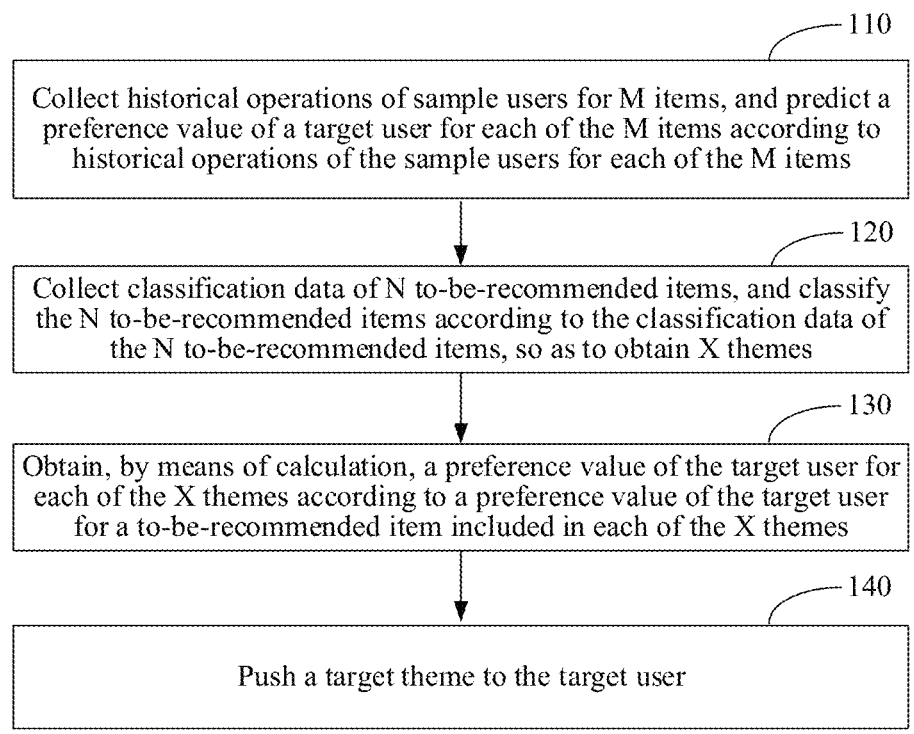
FIG. 1 is a flowchart of a theme recommendation method according to an embodiment of the present invention.

Referring to FIG. 1, FIG. 1 is a flowchart of a theme recommendation method according to an embodiment of the present invention. The theme recommendation method of this embodiment is executed by a computing device, and the theme recommendation method of this embodiment includes the following operations.

Operation 110: The computing device collects historical operations of sample users for M items, and predicts a preference value of a target user for each of the M items according to historical operations of the sample users for each of the M items.

The item (Item) may be an application. For example, the application may be Uber, Facebook, Myspace, Twitter, Microsoft Service Network (MSN), or the like. In addition, the item may further be an article, a video, a song, or the like. This is not specifically limited in the present invention. A sample user is a user who has performed a historical operation on the item and is selected as a sample. Historical operations of sample users for an item include, but is not limited to, browsing, clicking, downloading, using, paying, uninstalling, and commenting. Historical operations of sample users for an item may include a historical operation of the target user for the item, or may not include a historical operation of the target user for the item.

Figure 2:
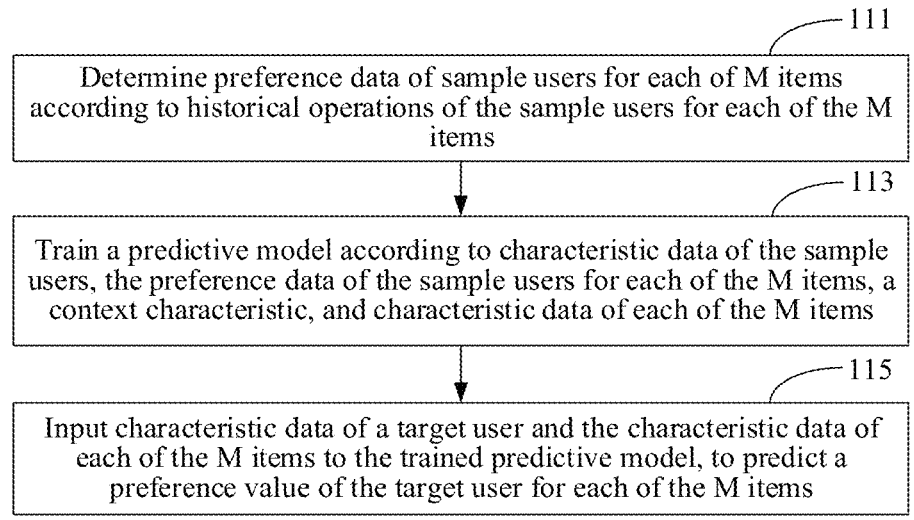
FIG. 2 is a flowchart of a specific operation of operation 110 in the theme recommendation method shown in FIG. 1.

In one embodiment, as shown in FIG. 2, the predicting a preference value of a target user for each of the M items according to historical operations of the sample users for each of the M items specifically includes the following operations.

Operation 111: The computing device determines preference data of the sample users for each of the M items according to the historical operations of the sample users for each of the M items. M is a positive integer greater than or equal to 1.

Preference data may be a value in an interval of [0, 1]. When the value is 1, it indicates that a sample user prefers an item to the highest extent. When the value is 0, it indicates that a sample user prefers an item to the lowest extent.

An example is provided below to describe how the computing device determines the preference data of the sample users for each of the M items according to the historical operations of the sample users for each of the M items. For example, an item A is an item of the M items. The computing device may preset a correspondence between historical operations of the sample users for the item A and preference data of the sample users for the item A, and then determine the preference data of the sample users for the item A according to the historical operations of the sample users for the item A, and the foregoing correspondence. The preset correspondence between the historical operations of the sample users for the item A and the preference data of the sample users for the item A is as follows: If a sample user pays for the item A, the preference data of the sample user for the item A is 1, if the sample user downloads the item A, the preference data of the sample user for the item A is 0.8, and if the sample user browses the item A, the preference data of the sample user for the item A is 0.2. Therefore, once the sample user pays for the item A, it may be determined that the preference data of the sample user for the item A is 1. Alternatively, once the sample user browses, downloads, and pays for the item A, it may be determined that the preference data of the sample user for the item A is the highest, or it may be determined that the preference data of the sample user for the item A is a sum of the three.

Operation 113: The computing device trains a predictive model according to characteristic data of the sample users, the preference data of the sample users for each of the M items, a context characteristic, and characteristic data of each of the M items.

The characteristic data of the sample users is data that can reflect characteristics of the sample users. For example, the characteristic data of the sample users may include, but is not limited to, genders, ages, and residential places of the sample users. Simply, the genders of the sample users may be represented by "0" or "1". "0" represents a female, and "1" represents a male. The ages of the sample users may be directly represented by the ages of the sample users. The residential places of the sample users may be represented by a code. For example, "1" represents New York, and "2" represents Washington.

The context characteristic is data that can reflect an ambient characteristic such as weather.

Characteristic data of an item is data that can reflect a characteristic of a sample user. For example, the characteristic data of the item may include, but is not limited to, a type (such as a shopping type or a game type) of the item. Simply, the type of the item may be represented by a code. For example, "1" represents a shopping type, and "2" represents a game type.

The predictive model may be a logistic regression (Logistic Regression) model, a decision tree, matrix factorization, or the like.

When the predictive model is trained, the predictive model is trained according to the characteristic data of the sample users, the preference data of the sample users for each of the M items, the context characteristic, and the characteristic data of each of the M items. For example, sample users include a sample user $A_1$, a sample user $A_2$, .... The M items include an item $a_1$, an item $a_2$, .... The predictive model is trained by using characteristic data of the sample user $A_1$, the context characteristic, characteristic data of the item $a_1$, and preference data of the sample user $A_1$ for the item $a_1$ as one piece of training data. The predictive model is trained by using the characteristic data of the sample user $A_1$, the context characteristic, characteristic data of the item $a_2$, and preference data of the sample user $A_1$ for the item $a_2$ as one piece of training data. The predictive model is trained by using characteristic data of the sample user $A_2$, the context characteristic, the characteristic data of the item $a_2$, and preference data of the sample user $A_2$ for the item $a_2$ as one piece of training data, and so on. After the predictive model is trained by using a large amount of data, priori knowledge of a preference value of a user that has some characteristic data for an item that has some characteristic data is learned by using the predictive model.

Operation 115: The computing device inputs characteristic data of the target user and the characteristic data of each of the M items to the trained predictive model, to predict the preference value of the target user for each of the M items.

The preference value may be a value in an interval of [0, 1]. When the value is 1, it indicates that the target user prefers an item to the highest extent. When the value is 0, it indicates that the target user prefers an item to the lowest extent.

For a well-trained predictive model, the model already has priori knowledge of a preference value of a user that has some characteristic data for an item that has some characteristic data. Therefore, after the characteristic data of the target user and the characteristic data of each of the M items are input, the preference value of the target user for each of the M items may be predicted. Using an example for description, the target user is a target user u, and the M items include an item $a_1$, an item $a_2$, . . . . After characteristic data of the target user u and characteristic data of the item $a_1$ are input to the predictive model, a preference value of the target user u for the item $a_1$ can be predicted by using the predictive model. After characteristic data of the target user u and characteristic data of the item $a_2$ are input to the predictive model, a preference value of the target user u for the item $a_2$ can be predicted by using the predictive model.

Figure 3:
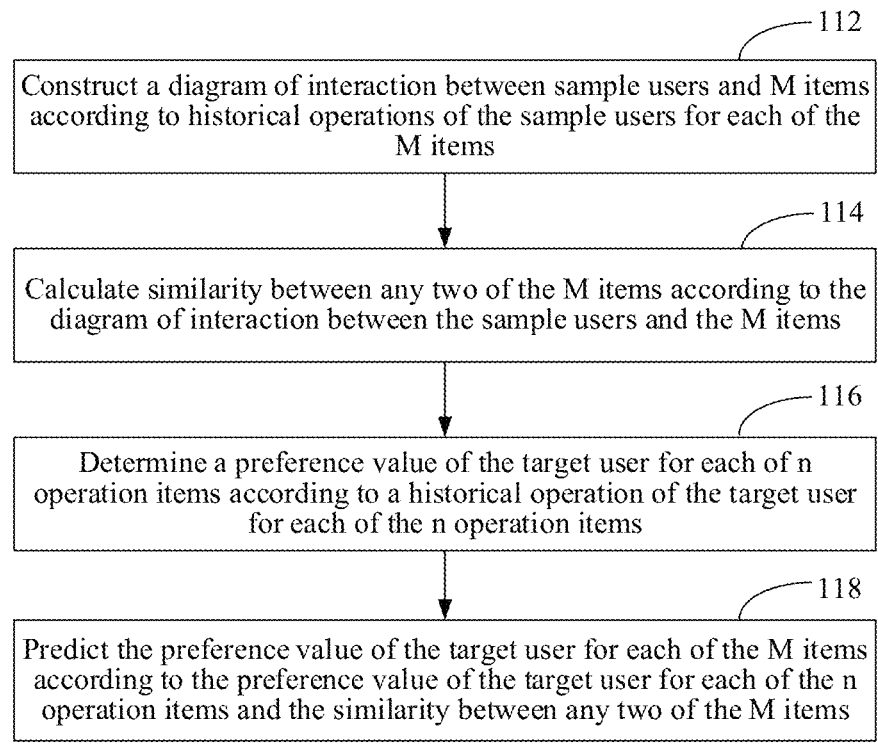
FIG. 3 is a flowchart of another specific operation of operation 110 in the theme recommendation method shown in FIG. 1.

In one embodiment, as shown in FIG. 3, the predicting a preference value of a target user for each of the M items according to historical operations of the sample users for each of the M items specifically includes the following operations.

Operation 112: The computing device constructs a diagram of interaction between the sample users and the M items according to the historical operations of the sample users for each of the M items.

Figure 4:
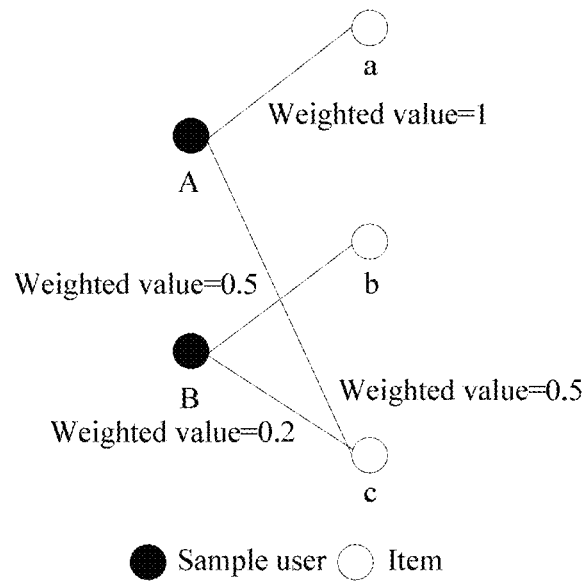
FIG. 4 is a diagram of interaction between sample users and an item in a theme recommendation method according to an embodiment of the present invention.

For example, the diagram of interaction between the sample users and the M items may be constructed in the following manners. As shown in FIG. 4, a black dot in the figure represents a sample user, a white dot in the figure represents an item of the M items, and a side that connects a black dot and a white dot in the figure represents that a sample user corresponding to the black dot has performed a historical operation on an item corresponding to the white dot. In addition, according to different historical operations performed by the sample user corresponding to the black dot on the item corresponding to the white dot, different weights may further be artificially assigned to the side. For example, when the historical operation is paying, an assigned weight is 1; or when the historical operation is downloading, an assigned weight is 0.8; or when the historical operation is browsing, an assigned weight is 0.2.

Operation 114: The computing device calculates similarity between any two of the M items according to the diagram of interaction between the sample users and the M items.

In one implementation, the computing device can calculate similarity between any two of the M items according to a SimRank algorithm. A characteristic of the SimRank algorithm is as follows: When a diagram of interaction (the diagram of interaction is formed by multiple dots and sides between two dots) is input, similarity between any two of the dots is output in the diagram of interaction. The SimRank algorithm is a mature algorithm. For details of the algorithm, refer to related materials. When the computing device uses the diagram of interaction between the sample users and the M items as an input of the SimRank algorithm, similarity between any two of the dots in the diagram of interaction is output. That is, similarity between sample users, similarity between the sample users and the M items, and similarity between any two of the M items are included. The computing device selects the similarity between any two of the M items from the output. The similarity between any two of the M items may be a value in an interval of [0, 1]. When the value is 1, it indicates that two items are similar to the highest extent. When the value is 0, it indicates that two items are similar to the lowest extent.

It may be understood that the similarity between any two of the M items may be calculated by using many algorithms such as a personal page rank (PPR) algorithm. The SimRank algorithm is only an example and constitutes no limitation.

Operation 116: The computing device determines a preference value of the target user for each of n operation items according to a historical operation of the target user for each of the n operation items. An operation item is an item, on which the target user has performed a historical operation, of the M items, n is a positive integer greater than or equal to 1, and N≤M.

The computing device may preset a relationship between a historical operation of the target user for an operation item and a preference value of the target user for the operation item. For example, the target user is a target user u, and an operation item a is an operation item of the n operation items. If the target user u has paid for the operation item a, a preference value of the target user u for the operation item a is 1. If the target user u has downloaded the operation item a, a preference value of the target user u for the operation item a is 0.8. If the target user u has browsed the operation item a, a preference value of the target user u for the operation item a is 0.2. Subsequently, the computing device determines the preference value of the target user for each of the n operation items according to the historical operation of the target user for each of the n operation items. For example, when the n operation items include Uber, Facebook, and Google, the preference value of the target user for each of the n operation items may be determined as follows: If the target user has paid for Uber, it is determined that a preference value of the target user for Uber is 1. If the target user has downloaded Facebook, it is determined that a preference value of the target user for Facebook is 0.8. If the target user has browsed Google, it is determined that a preference value of the target user for Google is 0.2. In the foregoing example, when the target user performs different historical operations on the n operation items, the target user has different preference values for each of the n operation items. However, in an actual application, when a quantity of times of browsing, a paid amount, a frequency of use are different, preference values of the target user for each of the n operation items may also be different.

Operation 118: The computing device predicts the preference value of the target user for each of the M items according to the preference value of the target user for each of the n operation items and the similarity between any two of the M items.

The computing device uses the preference value of the target user for each of the n operation items and the similarity between any two of the M items as inputs of formula (1), to calculate the preference value of the target user for each of the n operation items. The formula (1) is:

$$\mathrm{Sim}(u,a) = g(\mathrm{SimRank}(a_1,a), \ldots, \mathrm{SimRank}(a_k,a), \ldots, \mathrm{SimRank}(a_n,a), w(u,a_1), \ldots, w(u,a_k), \ldots, w(u,a_n)) \quad \text{Formula (1)}.$$

Sim (u,a) represents a preference value of a target user u for an item a, SimRank($a_k$,a) represents similarity between an operation item $a_k$ and the item a, w(u,$a_k$) represents a preference value of the target user u for the operation item $a_k$, $a_k$ represents any one of the n operation items, n is a quantity of the operation items, 0<k≤n, and a function g is an arbitrary aggregate function. For example, the aggregate function is a weighted average function. When the function g is a weighted average function, the formula (1) may alternatively be represented as:

$$Sim(u, a) = \frac{\left(\begin{array}{c} SimRank(a_1, a) \times w(u, i_1) + \ldots + SimRank(a_k a) \times \\ w(u, i_k) + \ldots + SimRank(a_n, a) \times w(u, i_n) \end{array}\right)}{w(u, i_1) + \ldots + w_2 + \ldots + w(u, i_n)}.$$

An example is provided below to describe how the computing device predicts a preference value of the target user for an item Hailo according to preference values of the target user for operation items Uber, Facebook, and Google. It is assumed that a preference value of the target user for Uber is 1, a preference value of the target user for Facebook is 0.8, a preference value of the target user for Google is 0.2, and similarity between Uber and Hailo is 1, similarity between Facebook and Hailo is 0.5, similarity between Google and Hailo is 0.2. In this case, it may be known through calculation according to the weighted average function that: a preference value of the target user for the item Hailo is (1*1+0.8*0.5+0.2*0.2)/3 and is approximately 0.85.

Operation 120: The computing device collects classification data of N to-be-recommended items, and classifies the N to-be-recommended items according to the classification data of the N to-be-recommended items, so as to obtain X themes. Each of the X themes includes at least one of the N to-be-recommended items, the N to-be-recommended items are some or all of the M items, X is a positive integer greater than or equal to 1, N is a positive integer greater than or equal to 1, and N≤M.

The N to-be-recommended items are some or all of the M items. When the N to-be-recommended items are some of the M items, N items may be arbitrarily selected from the M items as to-be-recommended items, or N items may be selected from the M items as to-be-recommended items according to a particular condition. In one embodiment, an item of the M items is selected as a to-be-recommended item, where a preference value of the target user for the item is greater than a selection threshold; or the M items are sorted in descending order according to preference values of the target user, and the first N items from the M items are selected as to-be-recommended items. The selection threshold may be artificially set as required. A higher selection threshold indicates a smaller quantity of to-be-recommended items, or otherwise, a lower selection threshold indicates a larger quantity of to-be-recommended items. A value of N may be a positive integer, and the value of N may be artificially set as required. A larger value of N indicates a larger quantity of to-be-recommended items, or otherwise, a smaller value of N indicates a smaller quantity of to-be-recommended items.

A theme may be artificially defined. For example, the theme may be artificially defined as shopping, sports, finance, entertainment, most needed, most popular, latest, and the like. In one embodiment, the theme includes at least a first-level theme and a second-level theme. The first-level theme is a previous-level theme of the second-level theme, and each first-level theme includes at least one second-level theme. For example, the first-level theme is "entertainment", and the second-level theme is "movie star" and "singer star".

In one embodiment, the computing device performs clustering according to the classification data of the N to-be-recommended items, so as to obtain the X themes. Specifically, the computing device uses the classification data of the N to-be-recommended items as an input of a clustering algorithm, and an output is classification of the N to-be-recommended items. Using an example for description, classification data of to-be-recommended items $a_1$ to $a_8$ is used as an input of a clustering algorithm, an output is that items $a_1$ to $a_3$ are clustered to a same class, items $a_4$ and $a_7$ are clustered to a same class, and items $a_5$, $a_6$, and $a_8$ are clustered to a same class. The computing device determines a theme of a class according to tags of to-be-recommended items clustered to the same class. For example, tags of the items $a_5$, $a_6$, and $a_8$ respectively are finance, finance, and finance and economics, and it may be determined that a theme of the class of the items $a_5$, $a_6$, and $a_8$ is finance. Classification data of to-be-recommended items may be classes, tags, and the like of the to-be-recommended items. The clustering algorithm may be a K-means clustering algorithm, a hierarchical clustering algorithm, a K-ME-DOIDS algorithm, a CLARANS algorithm, a BIRCH algorithm, a CURE algorithm, or a CHAMELEON algorithm.

In one embodiment, the computing device presets the X themes and a preset classification condition corresponding to each of the X themes, where different themes correspond to different preset classification conditions. For example, the computing device may preset the X themes respectively to "most needed", "most popular", "latest", and the like. A preset classification condition corresponding to the theme of "most needed" is that an item is a most frequently used item and is among the first N items having highest preference values of the target user for items. A preset classification condition corresponding to the theme of "most popular" is that an item is an item that users relatively preferably download and is among the first N items having highest preference values of the target user for items. A "latest" item may be defined as an item that has a relatively short on-shelf time and is among the first N items having highest preference values of the target user for items. The computing device determines whether classification data of each of the N to-be-recommended items satisfies a preset classification condition corresponding to any one of the X themes, and classifies a to-be-recommended item that satisfies the preset classification condition corresponding to any one of the X themes into a corresponding theme. The classification data of the to-be-recommended item may be a quantity of times the to-be-recommended item is used or downloaded, and an on-shelf time of the to-be-recommended item.

Operation 130: The computing device obtains, by means of calculation, a preference value of the target user for each of the X themes according to a preference value of the target user for a to-be-recommended item included in each of the X themes.

The preference value of the target user for the to-be-recommended item included in each of the X themes is used as an input of formula (2), and an output is the preference value of the target user for each of the X themes.

Score(u,t)=F(Sim(u,$a_1$), . . . ,Sim(u,$a_j$), . . . , Sim(u,$a_m$))     Formula (2).

Score(u,t) represents a preference value of a target user u for a theme t, Sim(u,$a_j$) represents a preference value of the target user u for a to-be-recommended item $a_j$, $a_j$ represents any to-be-recommended item in the theme t, m represents a quantity of to-be-recommended items in the theme t, $0<j\leq m$, and a function F is an arbitrary aggregate function. For example, if the aggregate function is an average function, formula (2) may alternatively be represented as:

$$\text{Score}(u,t)=(\text{Sim}(u,a_1)+\ldots+\text{Sim}(u,a_j)+\ldots+\text{Sim}(u,a_m))/m.$$

Using an example for description, if the theme t includes to-be-recommended items $a_1$ to $a_3$, a preference value of the target user for $a_1$ is 0.8, a preference value of the target user for $a_2$ is 0.6, and a preference value of the target user for $a_3$ is 0.4, a preference value of the target user for the theme t is (0.8+0.6+0.4)/3 and is 0.6.

Operation 140: The computing device pushes a target theme to the target user. The target theme is a theme, with a preference value of the target user being greater than a recommendation threshold, of the X themes.

The recommendation threshold may be artificially set as required. A higher recommendation threshold indicates a smaller quantity of recommended themes, or otherwise, a lower recommendation threshold indicates a larger quantity of recommended themes.

Figure 5:
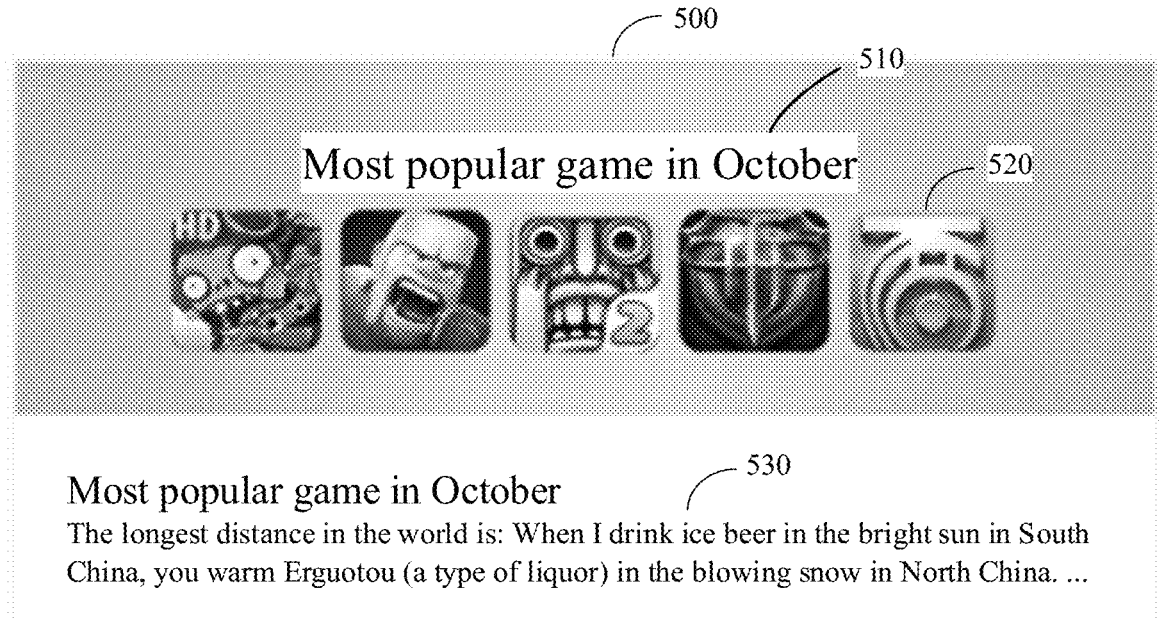
FIG. 5 is a schematic diagram of a presentation table in a theme recommendation method according to an embodiment of the present invention.

In one embodiment, the computing device pushes the target theme to the target user in a form of a presentation table shown in FIG. 5. A presentation table 500 shown in FIG. 5 includes a name 510 of the target theme, an icon 520 of a to-be-recommended item in the target theme, and a theme description 530 of the target theme. The theme description 530 describes characteristics of the target theme or reasons for recommending the target theme. The name 510 of the target theme is disposed in the middle of an upper area of the presentation table 500 and is written in capitals. Icons 520 of multiple to-be-recommended items in the target theme 510 are disposed in parallel below the name 510 of the target theme. The theme description 530 of the target theme 510 is disposed below the icons 520 of the multiple to-be-recommended items by using a clear font. When the presentation table is used for display, the name of the target theme 510, to-be-recommended items included in the target theme 510, and the theme description 530 of the target theme can be clearly displayed, thereby attracting interests of users and bringing considerable profits.

Figure 6:
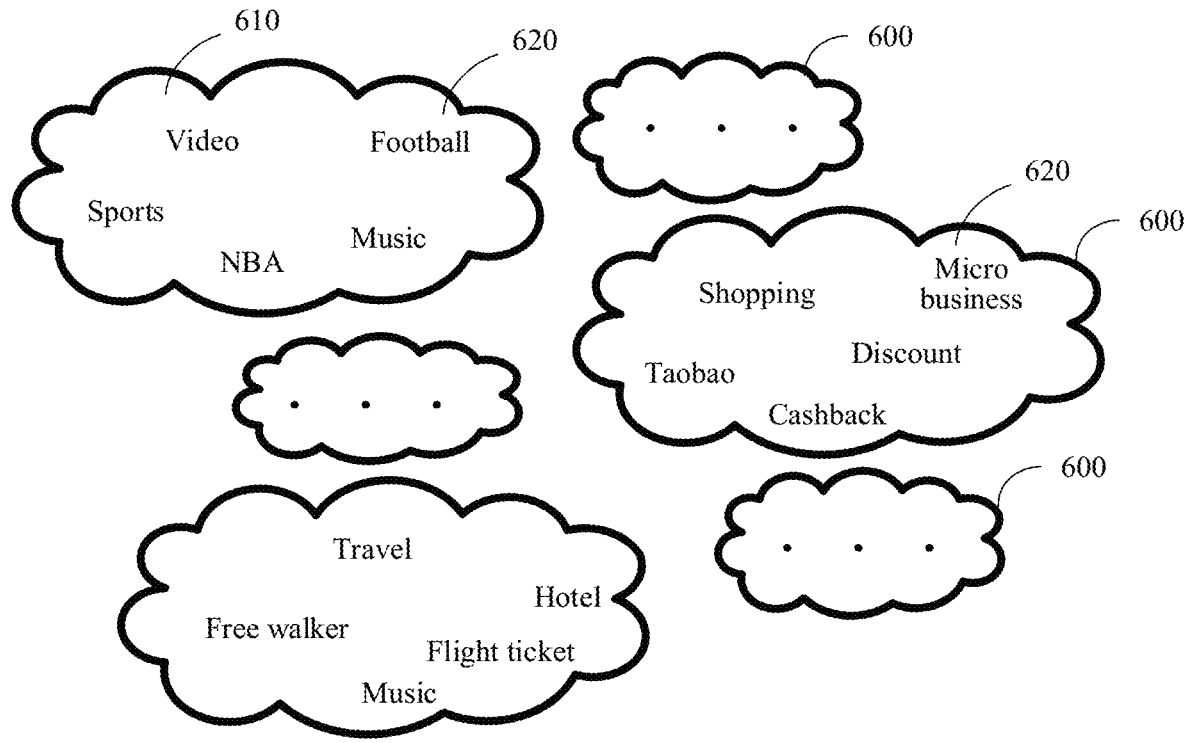
FIG. 6 is a schematic diagram of a tag cloud in a theme recommendation method according to an embodiment of the present invention.

In one embodiment, the computing device pushes the target theme to the target user in a form of a tag cloud shown in FIG. 6. A tag cloud 600 shown in FIG. 6 includes a name 610 of the target theme, and a tag 620 of a to-be-recommended item in the target theme. In the tag cloud 600, the name 610 of the target theme is displayed in the tag cloud 600 and is written in capitals, and tags 620 of to-be-recommended items in the target theme are displayed in the tag cloud 600 in a distributed manner by using a word size less than that of the name 610 of the target theme. When the tag cloud 600 is used for display, multiple themes can be conveniently and simultaneously displayed. Moreover, the presentation manner is vivid, which can attract interests of users, and generate considerable profits.

Figure 7:
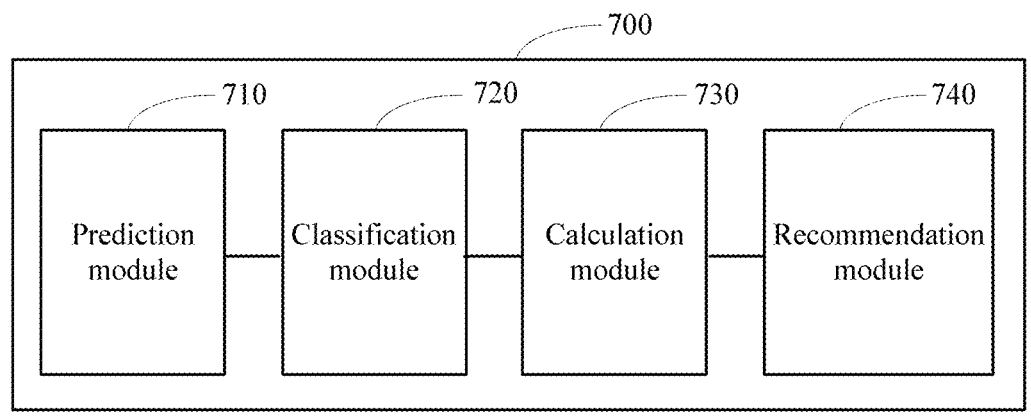
FIG. 7 is a schematic structural diagram of a theme recommendation apparatus according to an embodiment of the present invention.

Referring to FIG. 7, FIG. 7 is a schematic structural diagram of a theme recommendation apparatus according to an embodiment of the present invention. A theme recommendation apparatus 700 of this embodiment includes a prediction module 710, a classification module 720, a calculation module 730, and a recommendation module 740.

The prediction module 710 is configured to: collect historical operations of sample users for M items, and predict a preference value of a target user for each of the M items according to historical operations of the sample users for each of the M items, where M is a positive integer greater than or equal to 1.

The classification module 720 is configured to: collect classification data of N to-be-recommended items, and classify the N to-be-recommended items according to the classification data of the N to-be-recommended items, so as to obtain X themes, where each of the X themes includes at least one of the N to-be-recommended items, the N to-be-recommended items are some or all of the M items, X is a positive integer greater than or equal to 1, N is a positive integer greater than or equal to 1, and $N\leq M$.

The calculation module 730 is configured to obtain, by means of calculation, a preference value of the target user for each of the X themes according to a preference value of the target user for a to-be-recommended item included in each of the X themes.

The recommendation module 740 is configured to push a target theme to the target user, where the target theme is a theme, with a preference value of the target user being greater than a recommendation threshold, of the X themes.

In one embodiment, the historical operation includes at least one of the following operations: browsing, clicking, downloading, using, paying, uninstalling, or commenting.

In one embodiment, the recommendation module 740 is configured to push the target theme to the target user in a form of a tag cloud, where the tag cloud includes a name of the target theme and a tag of a to-be-recommended item in the target theme.

In one embodiment, the recommendation module 740 is configured to push the target theme to the target user in a form of a presentation table, where the presentation table includes a name of the target theme and an icon of a to-be-recommended item in the target theme.

In one embodiment, the theme includes at least a first-level theme and a second-level theme, and the first-level theme includes at least one second-level theme.

It may be understood that, for a specific operation executed the theme recommendation apparatus, refer to the contents of the foregoing method embodiments, and details are not described herein again.

Figure 8:
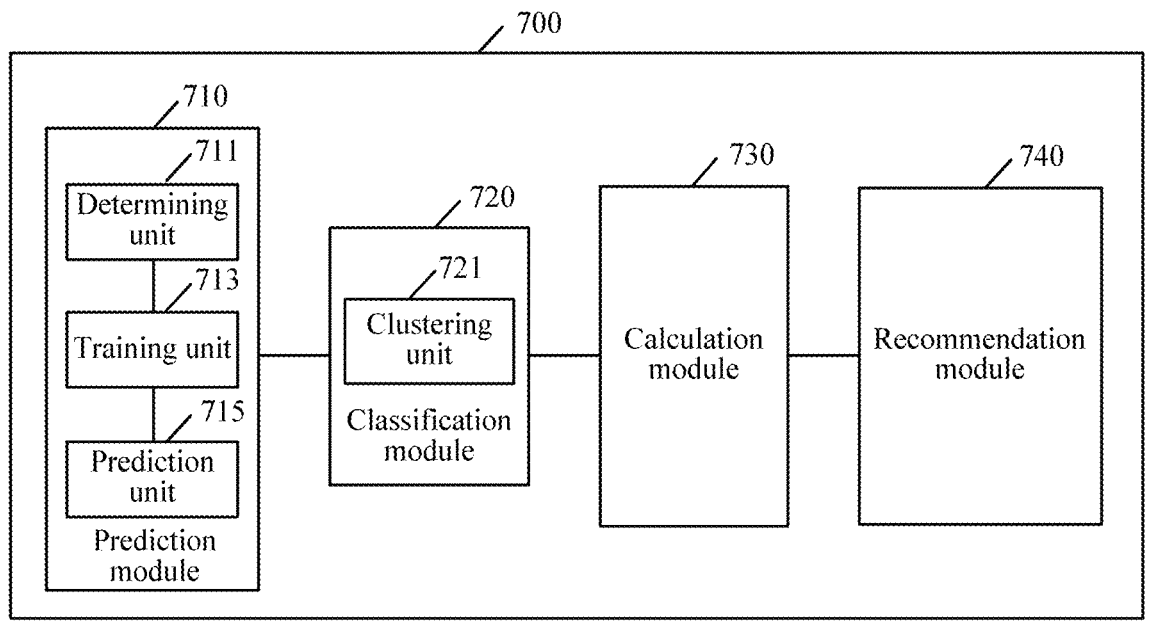
FIG. 8 is a schematic structural diagram of another theme recommendation apparatus according to an embodiment of the present invention.

Referring to FIG. 8, FIG. 8 is a schematic structural diagram of another theme recommendation apparatus according to an embodiment of the present invention. The theme recommendation apparatus of this embodiment is obtained by optimizing the prediction module 710 and the classification module 720 of the theme recommendation apparatus shown in FIG. 7. The prediction module 710 includes a determining unit 711, a training unit 713, and a prediction unit 715. The classification module 720 includes a clustering unit 721.

The determining unit 711 is configured to determine preference data of the sample users for each of the M items according to the historical operations of the sample users for each of the M items.

The training unit 713 is configured to train a predictive model according to characteristic data of the sample users, the preference data of the sample users for each of the M items, a context characteristic, and characteristic data of each of the M items.

The prediction unit 715 is configured to input characteristic data of the target user and the characteristic data of each of the M items to the trained predictive model, to predict the preference value of the target user for each of the M items.

The clustering unit 721 is configured to perform clustering according to the classification data of the N to-be-recommended items, so as to obtain the X themes.

It may be understood that, for a specific operation executed by the theme recommendation apparatus, refer to the contents of the foregoing method embodiments, and details are not described herein again.

Figure 9:
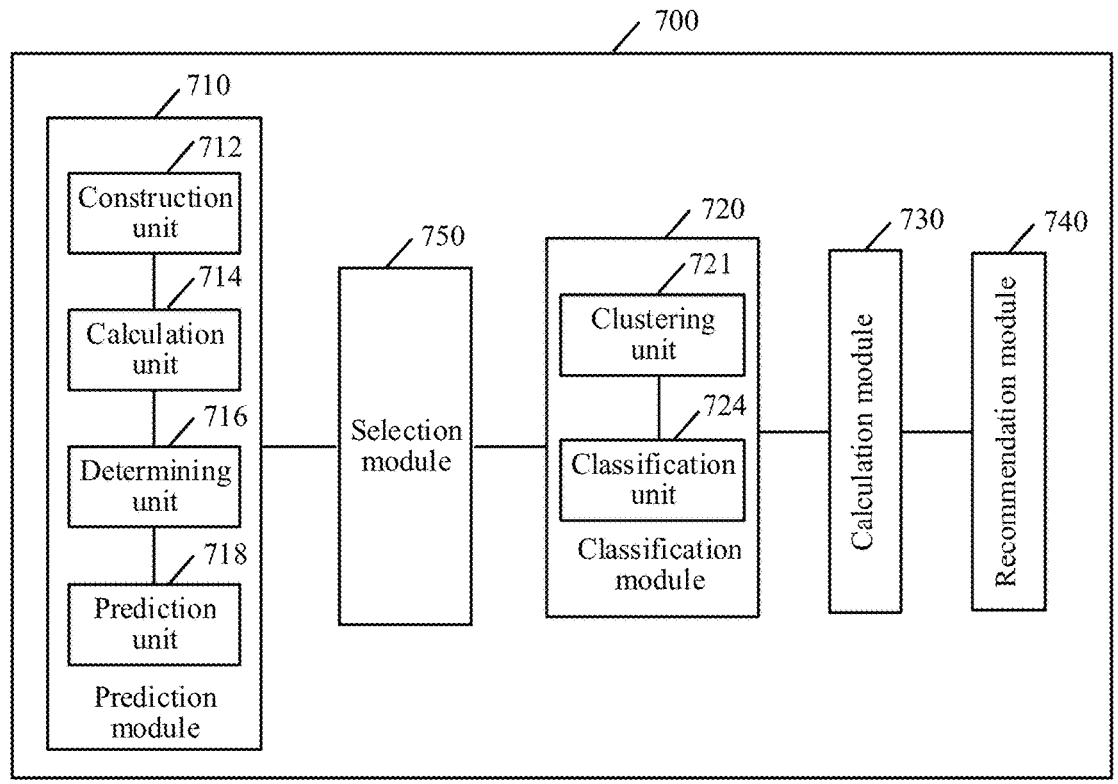
FIG. 9 is a schematic structural diagram of still another theme recommendation apparatus according to an embodiment of the present invention.

Referring to FIG. 9, FIG. 9 is a schematic structural diagram of still another theme recommendation apparatus according to an embodiment of the present invention. The theme recommendation apparatus of this embodiment is obtained by optimizing the theme recommendation apparatus shown in FIG. 7.

The theme recommendation apparatus further includes a selection module 750. The selection module 750 is configured to: select an item from the M items as a to-be-recommended item, where a preference value of the target user for the item is greater than a selection threshold; or sort the M items in descending order according to preference values of the target user, and select the first N items from the M items as to-be-recommended items.

The prediction module 710 includes a construction unit 712, a calculation unit 714, a determining unit 716, and a prediction unit 718.

The construction unit 712 is configured to construct a diagram of interaction between the sample users and the M items according to the historical operations of the sample users for each of the M items.

The calculation unit 714 is configured to calculate similarity between any two of the M items according to the diagram of interaction between the sample users and the M items.

The determining unit 716 is configured to determine a preference value of the target user for each of n operation items according to a historical operation of the target user for each of the n operation items, where an operation item is an item, on which the target user has performed a historical operation, of the M items, n is a positive integer greater than or equal to 1, and N≤M.

The prediction unit 718 is configured to predict the preference value of the target user for each of the M items according to the preference value of the target user for each of the n operation items and the similarity between any two of the M items.

The classification module 720 includes a presetting unit 722 and a classification unit 724.

The presetting unit 722 is configured to preset the X themes and a preset classification condition corresponding to each of the X themes, where different themes correspond to different preset classification conditions.

The classification unit 724 is configured to: determine whether classification data of each of the N to-be-recommended items satisfies a preset classification condition corresponding to any one of the X themes, and classify a to-be-recommended item that satisfies the preset classification condition corresponding to any one of the X themes into a corresponding theme.

It may be understood that, for a specific operation executed by the theme recommendation apparatus, refer to the contents of the foregoing method embodiments, and details are not described herein again.

Figure 10:
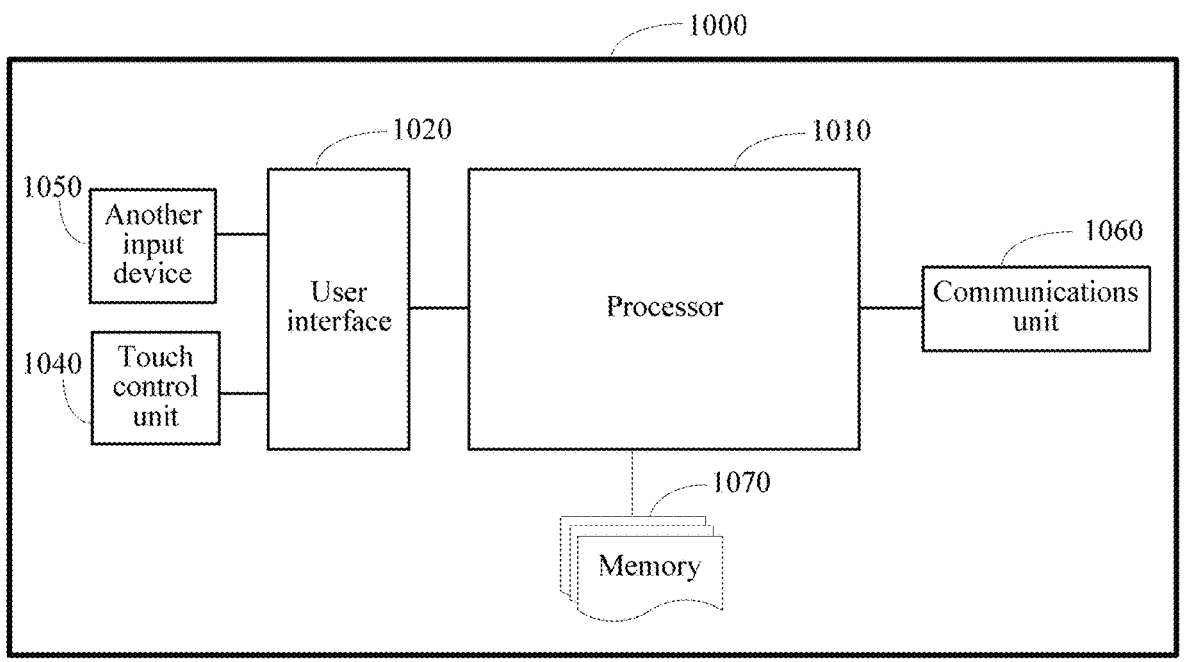
FIG. 10 is a schematic structural diagram of a computing device according to an embodiment of the present invention.

Referring to FIG. 10, FIG. 10 is a schematic structural diagram of a computing device according to an embodiment of the present invention. A computing device 1000 of this embodiment includes: a processor 1010, a user interface 1020, an input/output unit, a communications unit 1060, and a memory 1070.

The processor 1010 is a computing center of the computing device 1000, has a strong computing capability, and can perform various computings at a high speed. The processor 1010 may be a Central Processing Unit (CPU), a digital signal processor (DSP), a microcontroller unit (MCU), a logical circuit configured to execute control or computing, or the like. The processor 1010 may be a single-core processor, or may be a multi-core processor.

The user interface (UI) 1020 is a medium for interaction and information exchange between a system and a user, and implements conversion between an internal form of information and a form acceptable by human beings. The user interface 1020 may include three types: a command interface, a program interface, and a graphical interface.

The input/output unit may include a touch control unit 1040 and another input device 1050. The touch control unit 1040, also referred to as a touchscreen or a touchpad, may collect a touch operation of a user on or near the touch control unit 1040 (such as an operation of a user on or near the touch control unit 1040 by using any suitable item or accessory, such as a finger or a stylus), and drive a corresponding connection apparatus according to a preset program. Optionally, the touch control unit 1040 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1010. Moreover, the touch controller can receive and execute a command sent by the processor 1010. In addition, a touch-sensitive surface may be a resistive, capacitive, infrared, or surface sound wave typed touch-sensitive surface. In addition to the touch-sensitive surface, the input/output unit may further include another input device 1050. Specifically, the another input device 1050 may include, but is not limited to, one or more of a physical keyboard, a functional key (such as a volume control key or a switch key), a track ball, a mouse, and a joystick.

The communications unit 1060 may perform communication by using wireless technologies such as the cellular technology, the Bluetooth technology, the ZigBee technology, and the WLAN technology. Alternatively, the communications unit 1060 may perform communication by using wired technologies such as the UART technology, the printer port technology, the USB technology, and the wired network transmission technology.

The storage unit 1070 may include an internal memory and an external memory. The internal memory is configured to: store instructions and data of a currently-running program, and directly exchange information with the processor 1010. The information is a main source of data processed by the processor 1010. The internal memory may include a read-only memory and a random access memory. The external memory has a large storage capacity and a low price, but a slow storage speed, and is configured to store many programs and intermediate results and much data that are not needed temporarily. The external memory may exchange information with the internal memory by batch as required. The external memory can exchange information only with the internal memory, and cannot be directly accessed by another component of a computer system. A common external memory includes a magnetic disk, a magnetic tape, and a compact disk.

One or more programs executed by the processor 1010 include an instruction used for executing the following operations:

collecting historical operations of sample users for M items, and predicting a preference value of a target user for each of the M items according to historical operations of the sample users for each of the M items, where M is a positive integer greater than or equal to 1;

collecting classification data of N to-be-recommended items, and classifying the N to-be-recommended items according to the classification data of the N to-be-recommended items, so as to obtain X themes, where each of the X themes includes at least one of the N to-be-recommended items, the N to-be-recommended items are some or all of the M items, X is a positive integer greater than or equal to 1, N is a positive integer greater than or equal to 1, and N≤M;

obtaining, by means of calculation, a preference value of the target user for each of the X themes according to a preference value of the target user for a to-be-recommended item included in each of the X themes; and pushing a target theme to the target user, where the target theme is a theme, with a preference value of the target user being greater than a recommendation threshold, of the X themes.

In one embodiment, the processor 1010 is further configured to: determine preference data of the sample users for each of the M items according to the historical operations of the sample users for each of the M items; train a predictive model according to characteristic data of the sample users, the preference data of the sample users for each of the M items, a context characteristic, and characteristic data of each of the M items; and input characteristic data of the target user and the characteristic data of each of the M items to the trained predictive model, to predict the preference value of the target user for each of the M items.

In one embodiment, the processor 1010 is further configured to: construct a diagram of interaction between the sample users and the M items according to the historical operations of the sample users for each of the M items; calculate similarity between any two of the M items according to the diagram of interaction between the sample users and the M items; determine a preference value of the target user for each of n operation items according to a historical operation of the target user for each of the n operation items, where an operation item is an item, on which the target user has performed a historical operation, of the M items, n is a positive integer greater than or equal to 1, and N≤M; and predict the preference value of the target user for each of the M items according to the preference value of the target user for each of the n operation items and the similarity between any two of the M items.

In one embodiment, the historical operation includes at least one of the following operations: browsing, clicking, downloading, using, paying, uninstalling, or commenting.

Optionally, the processor 1010 is further configured to perform clustering according to the classification data of the N to-be-recommended items, so as to obtain the X themes.

In one embodiment, the processor 1010 is further configured to: preset the X themes and a preset classification condition corresponding to each of the X themes, where different themes correspond to different preset classification conditions; and determine whether classification data of each of the N to-be-recommended items satisfies a preset classification condition corresponding to any one of the X themes, and classify a to-be-recommended item that satisfies the preset classification condition corresponding to any one of the X themes into a corresponding theme.

In one embodiment, the processor 1010 is further configured to push the target theme to the target user in a form of a presentation table, where the presentation table includes a name of the target theme and an icon of a to-be-recommended item in the target theme.

In one embodiment, the processor 1010 is further configured to push the target theme to the target user in a form of a tag cloud, where the tag cloud includes a name of the target theme and a tag of a to-be-recommended item in the target theme.

In one embodiment, the theme includes at least a first-level theme and a second-level theme, and the first-level theme includes at least one second-level theme.

In one embodiment, the processor 1010 is further configured to: select an item from the M items as a to-be-recommended item, where a preference value of the target user for the item is greater than a selection threshold; or sort the M items in descending order according to preference values of the target user, and select the first N items from the M items as to-be-recommended items.

It may be understood that, for a specific operation executed by the computing device 1000, refer to the contents of the foregoing method embodiments, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is claimed is:

1. A computing device to implement a theme prediction method, the computing device comprising:
   a memory to store instructions; and
   a hardware processor configured to execute the instructions to perform operations including:
   collecting, by the hardware processor, historical operations of sample users for M items, and predicting a preference value of a target user for each of the M items according to historical operations of the sample users for each of the M items, wherein M is a positive integer greater than or equal to 1 including: determining preference data of the sample users for each of the M items according to the historical operations of the sample users for each of the M items; training a predictive model according to characteristic data of the sample users, the preference data of the sample users for each of the M items, a context characteristic, and characteristic data of each of the M items; and inputting characteristic data of the target user and the characteristic data of each of the M items to the trained predictive model, to predict the preference value of the target user for each of the M items, wherein the historical operations comprise operations including at least one of: browsing, clicking, downloading, using, and paying;
   collecting, by the hardware processor, classification data of N items, and classifying the N items according to the classification data to obtain X themes, wherein each of the X themes comprises at least one of the N items, the N items are some or all of the M items, X is a positive integer greater than or equal to 1, N is a positive integer greater than or equal to 1, and N≤M;
   calculating, by the hardware processor, a preference value of the target user for each of the X themes according to a preference value of the target user for an item in each of the X themes, comprising:
   calculating formula:

$$\text{Score}(u,t)=F(\text{Sim}(u,a_1), \ldots, \text{Sim}(u,a_j), \ldots, \text{Sim}(u,a_m)),$$

where Score(u,t) represents a preference value of a target user u for a theme t, Sim(u,$a_j$) represents a preference value of the target user u for an item $a_j$, $a_j$ represents any item in the theme t, m represents a quantity of items in the theme t, $0 < j \leq m$, and a function F is an aggregate function; and pushing, by the hardware processor, one or more applications of a target theme to the target user to be displayed on a display of a computing device of the target user, wherein the target theme is one of the X themes with a preference value of the target user greater than a threshold, wherein the one or more applications of the target theme are pushed to the target user in a form of a presentation table on the display, wherein the presentation table comprises a name of the target theme and an icon of an application in the target theme to be selectable by the user via a user interface of the computing device of the target user.

2. The computing device according to claim 1, wherein the predicting a preference value of a target user for each of the M items according to historical operations of the sample users for each of the M items comprises:

constructing a diagram of interaction between the sample users and the M items according to the historical operations of the sample users for each of the M items;

calculating similarity between any two of the M items according to the diagram of interaction between the sample users and the M items;

determining a preference value of the target user for each of n operation items according to a historical operation of the target user for each of the n operation items, wherein an operation item is one of the M items on which the target user has performed a historical operation, n is a positive integer greater than or equal to 1, and N≤M; and predicting the preference value of the target user for each of the M items according to the preference value of the target user for each of the n operation items and the similarity between any two of the M items.

3. The computing device according to claim 2, wherein determining the preference value of the target user for each of the n operation items according to a historical operation of the target user for each of the n operation items comprises calculating formula:

$$Sim(u,a) = g(SimRank(a_1,a), \ldots, SimRank(a_k,a), \ldots, SimRank(a_n,a), w(u,a_1), \ldots, w(u,a_k), \ldots, w(u,a_n)),$$

where Sim(u,a) represents a preference value of a target user u for an item a, SimRank($a_k$,a) represents a similarity algorithm applied for an operation item $a_k$ and the item a, w(u,$a_k$) represents a preference value of the target user u for the operation item $a_k$, $a_k$ represents any one of the n operation items, n is a quantity of the operation items, $0 < k \leq n$, and a function g is an aggregate function.

4. The computing device according to claim 3, wherein the SimRank comprises one of: a SimRank algorithm or a personal page rank (PPR) algorithm that outputs a value in an interval of [0, 1].

5. The computing device according to claim 3, wherein the aggregate function is a weighted average function.

6. The computing device according to claim 1, wherein the classifying the N items according to the classification data comprises:

performing clustering according to the classification data to obtain the X themes.

7. The computing device according to claim 1, wherein the classifying the N items according to the classification data of the N items comprises:

presetting the X themes and a preset classification condition corresponding to each of the X themes, wherein different themes correspond to different preset classification conditions; and determining whether classification data of each of the N items satisfies a preset classification condition corresponding to any one of the X themes, and classifying an item whose classification data satisfies the preset classification condition corresponding to any one of the X themes into a corresponding theme.

8. The computing device according to claim 1, wherein the pushing the one or more applications of a target theme to the target user comprises:

pushing the target theme to the target user in a form of a tag cloud, wherein the tag cloud comprises a name of the target theme and a tag of an application in the target theme.

9. The computing device according to claim 1, wherein the theme comprises at least a first-level theme and a second-level theme, and the first-level theme comprises at least one second-level theme.

10. The computing device according to claim 1, wherein before the collecting classification data of N items, the operations comprise:

selecting an item from the M items, wherein a preference value of the target user for the item is greater than a selection threshold; or sorting the M items in a descending order according to preference values of the target user, and selecting the first N items from the M items.

11. The computing device according to claim 1, wherein the classification data of the N items comprises at least one of a class and a tag, wherein the N items are classified using a K-means clustering algorithm, a hierarchical clustering algorithm, a K-MEDOIDS algorithm, a CLARANS algorithm, a BIRCH algorithm, a CURE algorithm, or a CHAMELEON algorithm.

12. A theme prediction apparatus, comprising:
one or more memories to store instructions; and
one or more hardware processors configured to execute the instructions to implement modules including:
a prediction module to collect historical operations of sample users for M items, and predict a preference value of a target user for each of the M items according to historical operations of the sample users for each of the M items, wherein M is a positive integer greater than or equal to 1, wherein the prediction module comprises: a determining unit to determine preference data of the sample users for each of the M items according to the historical operations of the sample users for each of the M items;
a training unit to train a predictive model according to characteristic data of the sample users, the preference data of the sample users for each of the M items, a context characteristic, and characteristic data of each of the M items; and a prediction unit to input characteristic data of the target user and the characteristic data of each of the M items to the trained predictive model, to predict the preference value of the target user for each of the M items, wherein the historical operations comprise operations including at least one of: browsing, clicking, downloading, using, and paying;
a classification module to collect classification data of N items, and classify the N items according to the classification data to obtain X themes, wherein each of the X themes comprises at least one of the N items, the N items are some or all of the M items, X is a positive integer greater than or equal to 1, N is a positive integer greater than or equal to 1, and N≤M;

a calculation module to calculate a preference value of the target user for each of the X themes according to a preference value of the target user for an item comprised in each of the X themes, comprising:

calculating formula:

$$Score(u,t)=F(Sim(u,a_1), \ldots, Sim(u,a_j), \ldots, Sim(u,a_m)),$$

where Score(u,t) represents a preference value of a target user u for a theme t, $Sim(u,a_j)$ represents a preference value of the target user u for an item $a_j$, $a_j$ represents any item in the theme t, m represents a quantity of items in the theme t, $0 < j \leq m$, and a function F is an aggregate function; and a recommendation module to push one or more applications of a target theme to the target user to be displayed on a display of a computing device of the target user, wherein the target theme is one of the X themes with a preference value of the target user being greater than a threshold, wherein the recommendation module is configured to push the one or more applications of the target theme to the target user in a form of a presentation table on the display, wherein the presentation table comprises a name of the target theme and an icon of an application in the target theme to be selectable by the user via a user interface of the computing device of the target user.

13. The apparatus according to claim 12, wherein the prediction module comprises:

a construction unit to construct a diagram of interaction between the sample users and the M items according to the historical operations of the sample users for each of the M items;

a calculation unit to calculate similarity between any two of the M items according to the diagram of interaction between the sample users and the M items;

a determining unit to determine a preference value of the target user for each of n operation items according to a historical operation of the target user for each of the n operation items, wherein an operation item is an item, on which the target user has performed a historical operation, of the M items, n is a positive integer greater than or equal to 1, and N≤M; and a prediction unit to predict the preference value of the target user for each of the M items according to the preference value of the target user for each of the n operation items and the similarity between any two of the M items.

14. The apparatus according to claim 12, wherein the classification module comprises a clustering unit to perform clustering according to the classification data to obtain the X themes.

15. The apparatus according to claim 12, wherein the classification module comprises:

a presetting unit to preset the X themes and a preset classification condition corresponding to each of the X themes, wherein different themes correspond to different preset classification conditions; and a classification unit to determine whether classification data of each of the N items satisfies a preset classification condition corresponding to any one of the X themes, and classify an item that satisfies the preset classification condition corresponding to any one of the X themes into a corresponding theme.

16. The apparatus according to claim 12, wherein the recommendation module is configured to push the one or more applications of the target theme to the target user in a form of a tag cloud, wherein the tag cloud comprises a name of the target theme and a tag of an application in the target theme.

17. The apparatus according to claim 12, wherein a theme comprises at least a first-level theme and a second-level theme, and the first-level theme comprises at least one second-level theme.

18. The apparatus according to claim 12, wherein the apparatus further comprises a selection module configured to select an item from the M items, wherein a preference value of the target user for the item is greater than a selection threshold; or sort the M items in descending order according to preference values of the target user, and select the first N items from the M items.

\* \* \* \* \*